US006873843B2

(12) United States Patent
Nakajima

(10) Patent No.: US 6,873,843 B2
(45) Date of Patent: Mar. 29, 2005

(54) INFORMATION PROCESSING APPARATUS AND METHOD THEREOF, INFORMATION PROCESSING SYSTEM AND RECORDING MEDIUM

(75) Inventor: Yasuhisa Nakajima, Kanagawa (JP)

(73) Assignee: Sony Corporation, Tokyo (JP)

( * ) Notice: Subject to any disclaimer, the term of this patent is extended or adjusted under 35 U.S.C. 154(b) by 509 days.

(21) Appl. No.: 09/934,170

(22) Filed: Aug. 21, 2001

(65) Prior Publication Data

US 2002/0026382 A1 Feb. 28, 2002

(30) Foreign Application Priority Data

Aug. 22, 2000 (JP) .................................... P2000-250532

(51) Int. Cl.[7] ................................................ H04M 3/00

(52) U.S. Cl. ...................... 455/419; 455/418; 455/420; 705/26; 705/41

(58) Field of Search .......................... 455/414.1, 414.3, 455/419, 403, 410, 411; 705/7, 16, 17–26, 37; 235/383

(56) References Cited

U.S. PATENT DOCUMENTS 5,943,611 A * 8/1999 Molne ....................... 455/564
6,512,919 B2 * 1/2003 Ogasawara ............. 455/422.1
6,577,861 B2 * 6/2003 Ogasawara ................ 455/419

* cited by examiner

*Primary Examiner*—William Trost
*Assistant Examiner*—Danh C Le
(74) *Attorney, Agent, or Firm*—Frommer Lawrence & Haug LLP; William S. Frommer; Hans R. Mahr

(57) ABSTRACT

Information processing apparatus and method thereof, information processing system and recording medium for easily indicating the delivery address of purchased products. A user terminal device sends a telephone number of a delivery address for a purchased product by way of a relay station to a server. Along with designating the telephone company from the received telephone number of the delivery address, the server also sends the received telephone number to any of a plurality of telephone company control centers of the designated telephone company and requests a search for customer information. The telephone company control centers each receive the search request from the server and search the customer information accumulated in a plurality of databases. The server presents the search results (customer information) supplied from the plurality of databases to the user terminal device.

5 Claims, 10 Drawing Sheets

BANK SERVER
4
SERVICE PROVIDER
5
SERVER
3
RELAY STATON
2
2a
USER TERMINAL DEVICE
1
1a
TELEPHONE COMPANY CONTROL CENTER
6−1
6−1a
DB
7−1
TELEPHONE COMPANY CONTROL CENTER
6−2
6−2a
DB
7−2
TELEPHONE COMPANY CONTROL CENTER
6−3
6−3a
DB
7−3
8 CELLULAR TELEPHONE
8a 3
4
BANK SERVER
5
SERVICE PROVIDER
54
BILLING GATEWAY
57
INTERNET GATEWAY
53
CUSTOMER CONTROL SECTION
52
FEE CONTROL SECTION
56
APPLICATION CONTROL SECTION
51
CONGESTION CONTROL SECTION
55
CONGESTION CONTROLLER
6
TELEPHONE COMPANY CONTROL CENTER
2 RELAY STATION

FIG.4

| TELEPHONE NO. | NAME | ADDRESS |
| --- | --- | --- |
| 03-2345-6789 | TARO EDO | *** CHUOH-KU, TOKYO |
| 045-123-4567 | HANAKO HEISEI | *** YOKOHAMA-SHI, KANAGAWA-KEN |
| . . . | . . . | . . . |

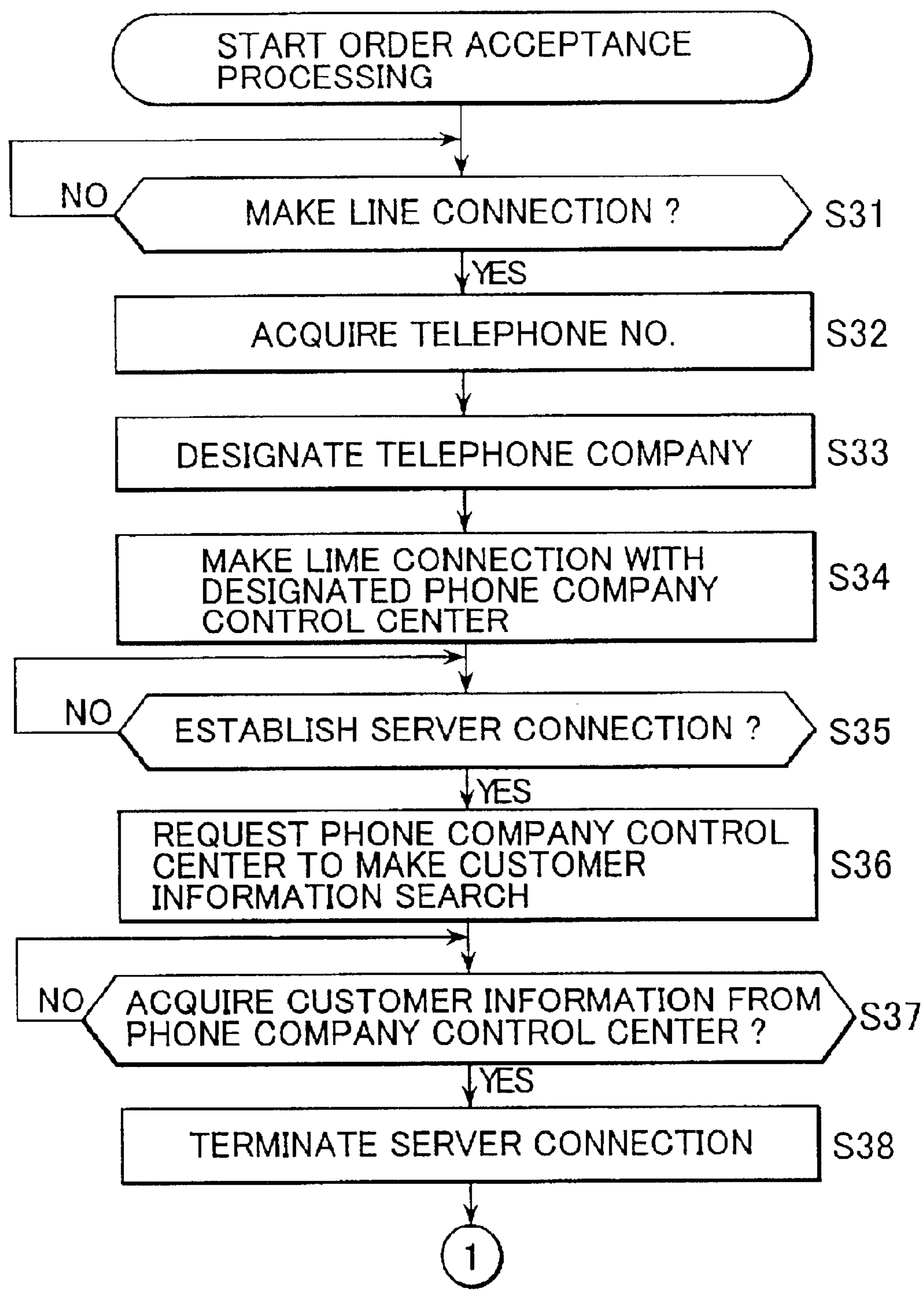
(10-1)
FIG.10
START ORDER ACCEPTANCE PROCESSING
NO
MAKE LINE CONNECTION ?
S31
YES
ACQUIRE TELEPHONE NO.
S32
DESIGNATE TELEPHONE COMPANY
S33
MAKE LIME CONNECTION WITH DESIGNATED PHONE COMPANY CONTROL CENTER
S34
NO
ESTABLISH SERVER CONNECTION ?
S35
YES
REQUEST PHONE COMPANY CONTROL CENTER TO MAKE CUSTOMER INFORMATION SEARCH
S36
NO
ACQUIRE CUSTOMER INFORMATION FROM PHONE COMPANY CONTROL CENTER ?
S37
YES
TERMINATE SERVER CONNECTION
S38
1

(10-2)

INFORMATION PROCESSING APPARATUS AND METHOD THEREOF, INFORMATION PROCESSING SYSTEM AND RECORDING MEDIUM

BACKGROUND OF THE INVENTION

1. Field of the Invention

The present invention relates to an information processing apparatus and method thereof, an information processing system and recording medium, and relates in particular to an information processing apparatus and method thereof, an information processing system and recording medium capable of easily indicating the delivery address of a purchased product.

2. Description of the Related Art

Network systems as typified by the Internet have spread widely in recent years. This expansion makes electronic commerce (EC) such as the transmission of information or the receiving of information over the Internet easy to perform.

However, during electronic commerce transactions, the delivery address (destination) of the purchased product (contents) may not always be the address and terminal device of the user purchasing that product. In the case of a present for example, the product is not sent to the address and terminal device of the user purchasing that product but is instead shipped to a delivery address specified by the purchaser.

When shipping a purchased product to a delivery address specified by the user, the user must enter information such as the full name and delivery address of the recipient by an input device such as a keyboard. However, entering information from the keyboard and in some cases switching to or from the Japanese language keyboard may be troublesome and annoying to the general user.

The opportunity to sell a product to the user may therefore be lost, even if the user wanted to perform a transaction by electronic commerce.

SUMMARY OF THE INVENTION

In view of the circumstances of the related art, the present invention has the object of easily specifying the delivery address of the purchased product.

The information processing apparatus of the present invention comprises search request means for connecting to a second device based on the telephone number entered from the first device and requesting a search of customer information, presenting means for presenting the search results supplied from the second device to the first device, and order issuing means for issuing an order for a product to a third device based on the order information input from the first device.

The information processing apparatus of the present invention further comprises storage means for storing customer information supplied from the second device, and search means for searching customer information stored in the storage means based on the telephone number input from the first device, and the presenting means is capable of presenting the customer search information results obtained from a search means when a search of customer information is made, to a first device.

The customer information is capable of containing a name or an address.

An information processing method of the present invention comprises a search request step for connecting to a second device based on said telephone number entered from the first device and requesting a search of customer information, a presentation step for presenting the search results supplied from the second device to the first device, and an order issue step for issuing an order for a product to a third device based on order information input from a first device.

A program recorded on the recording medium of the present invention comprises the steps of making a search request for connecting to a second device based on the telephone number entered from the first device and requesting a search of customer information, a step for presenting the search results supplied from the second device to the first device, and a step for issuing a purchase order for a product to a third device based on order information input from a first device.

In the information processing apparatus and method, and program recorded on the recording medium of the present invention, a search for customer information is requested to the second device based on the telephone number input from the first device, and search results supplied from the second device are presented to the first device, and a purchase of a product is ordered to a third device based on order information input from the first device.

The information processing system of the present invention comprises first sending means wherein a telephone number of the delivery address of the product is input by a first information processing apparatus and sent to a second information processing apparatus; acquisition means to acquire customer information corresponding to a telephone number presented from a second information device; search request means including second sending means for sending purchase ordering information for a product to a second information processing apparatus, and the second information processing apparatus connects to a third information processing apparatus based on the telephone number input from a first information processing apparatus, and a search of customer information is requested; presentation means for presenting the search results supplied from a third information processing apparatus to the first information processing apparatus; and storage means including a purchasing ordering means for issuing an order to a fourth information processing apparatus based on purchase order information input from the first information processing apparatus, and the third information processing apparatus stores the customer information; and search means for searching for customer information stored by the storage means based on a search request from the second information processing apparatus; and notification means including supply means for supplying the search results of the search means to the second information processing apparatus, and a fourth information processing apparatus receives the purchasing order for the product from the second information processing apparatus, and notifies the second information processing apparatus that receipt of the purchasing order is complete.

In the information processing system of the present invention, the third information processing apparatus is requested to make a search of customer information by the second information processing apparatus based on a telephone number input from the first information processing apparatus, the search results supplied from the third information processing apparatus are presented to the first information processing apparatus, and an order for purchasing the product is issued to a fourth information processing apparatus based on purchasing order information input from the first information processing apparatus.

The information processing apparatus and method, and program recorded on the recording medium of the present invention are therefore capable of easily specifying the delivery address of the purchased product, by requesting a search of customer information by a second information processing apparatus, based on a telephone number input by a first information processing apparatus, presenting the search results supplied from the second device to the first device, and issuing a purchasing order for the product to the third device.

The information processing system of the present invention is therefore capable of easily specifying the delivery address of the purchased product, by the second information processing apparatus making a request to a third information processing apparatus for a search of customer information based on a telephone number input by a first information processing apparatus, and presenting the search results supplied from the third information processing apparatus to the first information processing apparatus, and issuing a purchasing order for the product to the fourth information processing apparatus based on the purchase ordering information supplied from the first information processing apparatus.

BRIEF DESCRIPTION OF THE DRAWINGS

FIG. 4 is a drawing illustrating the customer information stored internally in the customer control section of FIG. 3.

FIG. 10 is a flowchart for describing the order acceptance processing.

DETAILED DESCRIPTION OF THE PREFERRED EMBODIMENTS

Figure 1:
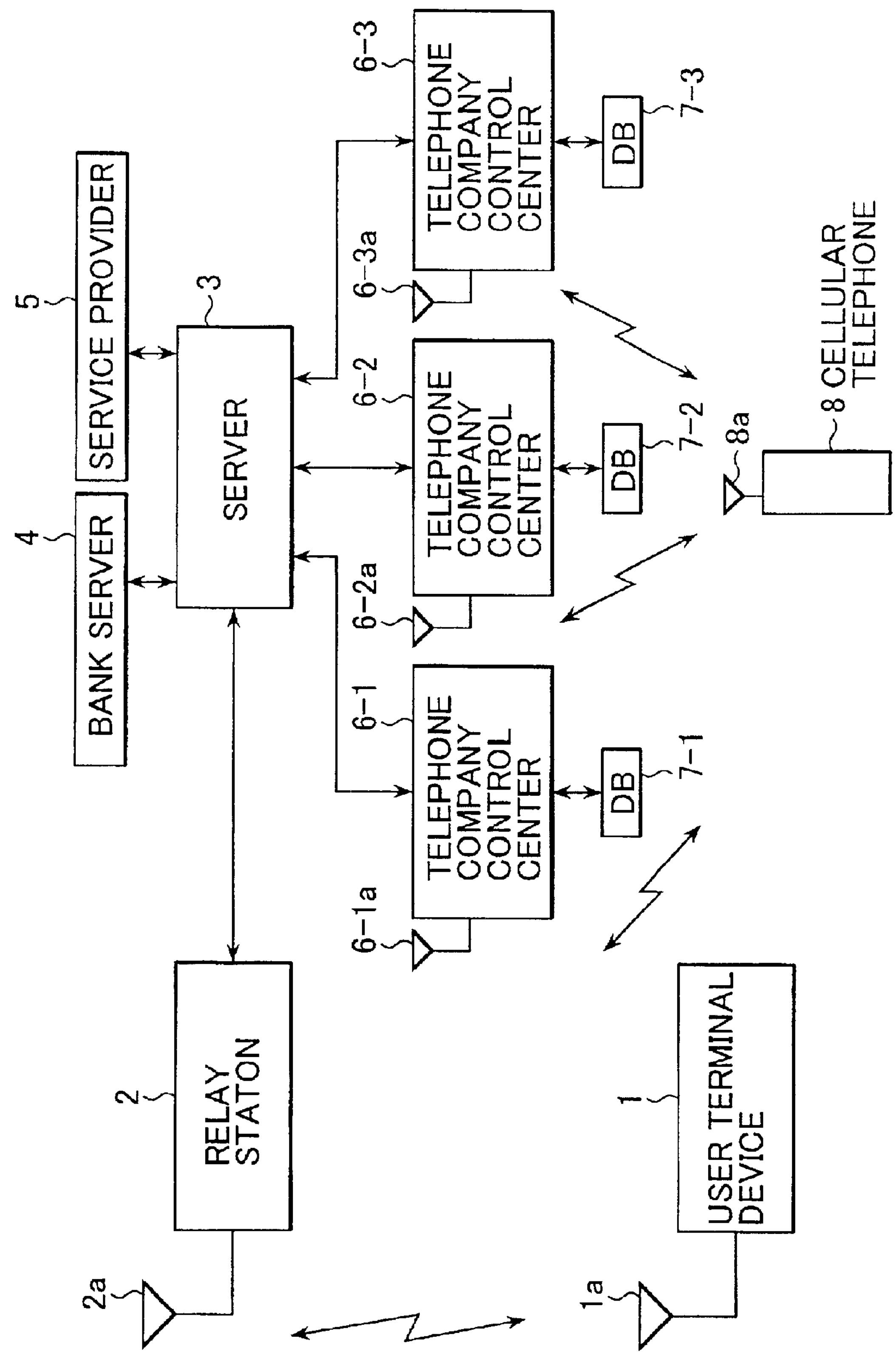
FIG. 1 is a block diagram showing a typical structure of the information processing system of the present invention.

A block diagram of a typical structure of the information processing system of the present invention is shown in FIG. 1. In this structure, a user terminal device 1 and a relay station 2 communicate by wireless communication, the relay station 2 is connected to a server 3, and the server 3 is further connected to the telephone company control centers 6-1 through 6-3. The user terminal device 1 and a relay station 2 are also capable of communication over landlines (wires or cables) such as by public telephone lines.

The user terminal 1 receives for example, a digital television broadcast program or commercial shopping program (so-called television shopping) and is comprised of a hard disk recorder to record the received programs. The user terminal device 1 sends the information (telephone of the product delivery address or ordering information, etc.) relating to the product purchase input by the user, to the relay station 2 by way of the antenna 1*a*.

The relay station 2 sends the information relating to the purchased product from the user terminal device 1 by way of then antenna 2*a* to the server 3.

The server 3, along with specifying a telephone company from information (telephone number) relating to the purchased product sent from the user terminal device 1 by way of the relay station 2, sends the received telephone number to one or any one of the telephone company control centers 6-1 through 6-3 corresponding to the specified telephone company and requests a search of customer information. The server 3 also presents (sends) the search results (customer information) supplied from the telephone company control centers 6-1 through 6-3, to the terminal device 1. The server 3 also issues an order for the designated product to the service provider 5, based on the information relating to the purchased product sent from the user terminal device 1. The server 3 further makes an inquiry to a bank server 4 as to whether the user terminal device 1 is capable of making payment.

The bank server 4 in response to the inquiry from the server 3, investigates whether or not the user of the user terminal 1 is capable of making payment. The service provider 5 receives the purchase order from the server 3, and notifies the server 3 of the completion of order acceptance. The service provider 5 ships the product to the designated delivery address on the specified day of delivery.

The telephone company control centers 6-1 through 6-3 each respectively receive the search request from the server 3 and search the customer information accumulated in the databases (DB) 7-1 through 7-3. Customer information such as names and addresses are accumulated for each telephone number in the databases (DB) 7-1 through 7-3.

The telephone company control centers 6-1 is the control center for the A corporation, the telephone company control centers 6-2 is the control center for the B corporation, and the telephone company control centers 6-3 is the control center for the C corporation. In other words, the customer information for users bound by a contract with the A corporation is accumulated in the database 7-1, customer information for users bound by a contract with the B corporation is accumulated in the database 7-2, and customer information for users bound by a contract with the C corporation is accumulated in the database 7-3.

A cellular telephone 8 is compatible with the communication methods of any or any one of the telephone company control centers 6-1 through 6-3 (hereafter to make the description easy to understand, the cellular telephone 8 is provided (sold) by the A corporation telephone company. An antenna 8*a* of the cellular telephone 8 receives data (for example, contents) sent from any of antennas 6-1*a* through 6-3*a* (in this case, the antenna 6-3*a*) from any or any one of the telephone company control centers 6-1 through 6-3 (in this case, the telephone company control center 6-1). The cellular telephone 8 is capable of all types of (and overlapping) data communications such as the sending and receiving electronic mail, or viewing simple home pages, and sending and receiving images, etc.

Figure 2:
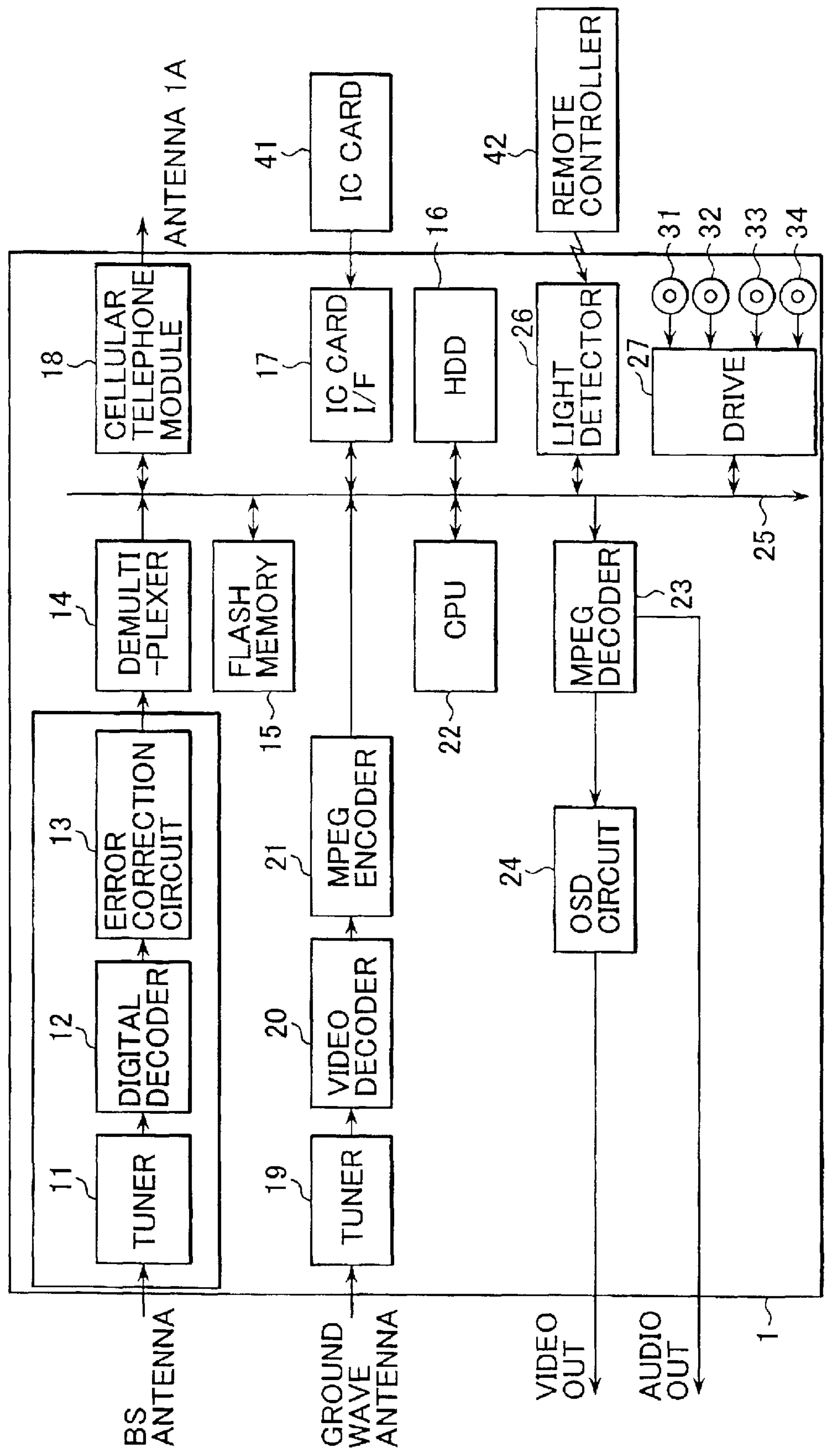
FIG. 2 is a block diagram showing in detail a typical structure of the user terminal device of FIG. 1.

FIG. 2 is a block diagram showing in detail a typical structure of the user terminal device of FIG. 1.

In the user terminal device 1, a tuner 11 receives a signal converted to an intermediate frequency signal, from a signal received by a BS antenna not shown in the drawing, and converts that intermediate frequency signal to a baseband signal. A digital demodulator 12 digitally demodulates the baseband signal input from the tuner 11, and outputs the demodulated data to an error correcting circuit 13. The error correcting circuit 13 performs error correction processing of the demodulated data input from the digital demodulator 12, and outputs this to the demultiplexer 14. The demultiplexer 14 is controlled from the CPU 22, and extracts data for the program channel desired by the viewer, from among the data on channels transmitted input from the error correcting circuit 13.

When instructed by the viewer, a hard disk drive (HDD) 16 receives and records the data supplied from the demultiplexer 14 by way of the system bus 25. An IC card 41 loaded into an IC card interface 17 utilizes a key (primary key) recorded within the IC card 41, to implement descramble processing (primary decoding). The cellular telephone module 18 communicates by radio (wireless) with the nearest relay station 2 by way of the antenna 1*a*, and acquires the required key (secondary key), and stores the secondary key in a flash memory 15.

A tuner 19 demodulates a ground wave broadcast signal received by a ground wave antenna not shown in the drawing, and outputs a baseband signal. A video decoder 20 preprocesses the baseband video signal input from the tuner 19 and converts the analog signal to a digital signal, and outputs the digital signal to an MPEG (Moving Picture Experts Group) encoder 21. The MPEG encoder 21 compresses the video data input from the video decoder 20 by the MPEG method. When instructed to record the data, the output from the MPEG encoder 21 is supplied to the hard disk drive 16 by way of the system bus 25 and recorded.

When data reproduced from the hard disk drive 16 or data output from the demultiplexer 14 or from the MPEG encoder 21 is supplied by way of the system bus 25, the MPEG decoder 23 decodes the data by the MPEG method, and outputs the acquired signal to an OSD (On Screen display) circuit 24, and outputs the audio signal to a speaker not shown in the drawing. The video signal such as letters, controlled from the OSD circuit 24 or the CPU 22, is multiplexed onto the video signal input from the MPEG decoder 23, and output to a CRT (Cathode Ray Tube) not shown in the drawing.

A light detector 26 receives the light output as an infrared ray signal from the remote controller 42, and outputs a corresponding detection signal to the CPU 22 by way of the system bus 25. A magnetic disk 31, or an optical disk 32, or a magneto-optical disk 33, or a semiconductor memory 34 is loaded in a drive 27, and programs recorded on those disks or memories are loaded as needed.

Figure 3:
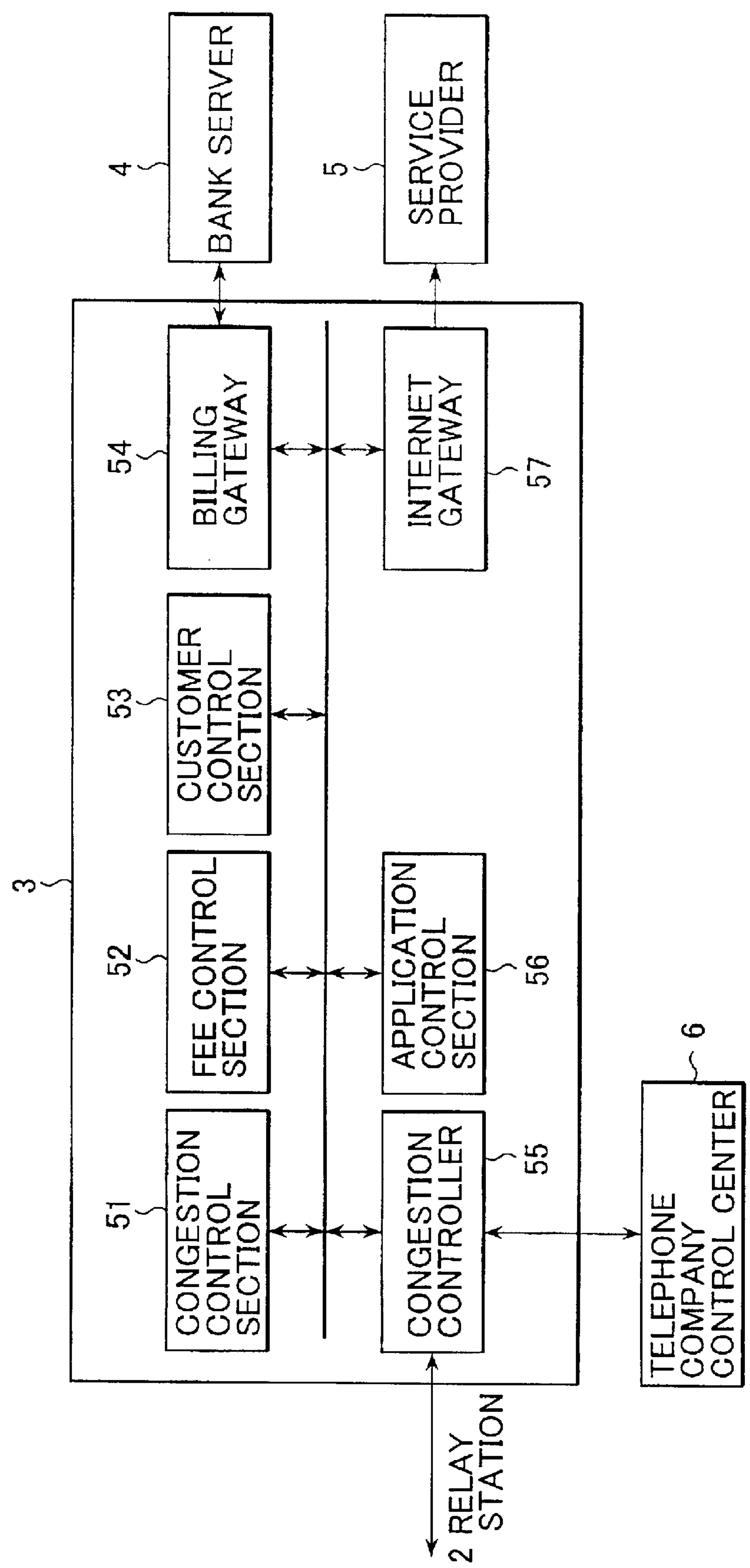
FIG. 3 is a block diagram showing in detail a typical structure of the server of FIG. 1.

FIG. 3 is a block diagram showing in detail a typical structure of the server of FIG. 1.

A congestion control section 51 controls a congestion controller 55, and makes a connection with the relay station 2. The congestion control section 51 controls the congestion controller 55, and supplies the customer information (telephone numbers) sent from the user terminal 1 by way of relay station 2, to the customer control section 53. The congestion control section 51 further makes an order for a product to the service provider 5 by way of an Internet gateway 57, and the received order information such as the deadline acquired in this way from the service provider 5, is sent to the terminal device 1 by way of the congestion control section 55.

A fee control section 52 processes the billing for the user terminal 1, and issues a bill.

The customer control section 53 verifies whether the customer information (telephone number) supplied from the congestion controller 55 is already stored internally, and when determined to be already stored, notifies the user terminal 1 that authorization is complete. However, when determined that the customer information is still not stored internally, the telephone company is designated from that telephone number (for example, telephone company of A corporation), and a request for company information made to the telephone company control center 6-1 by way of the congestion control section 55. The customer control section 53 also connects to the bank server 4 by way of the billing gateway 54, and performs processing to settle the account based on the registered billing method (for example, billing by credit card, or billing by adding to other bills).

The congestion controller 55 controls wire communications such as over telephone lines or cables, etc. When for example, receiving information involving a product purchase, or sending authorization results, data is exchanged by communicating with the relay 2 by way of this congestion controller 55.

Based on the search results sent from the telephone company control center 6-1 by way of the congestion control section 55, the application control section 56 changes the information into information displayable on the user terminal device 1, and sends this to the user terminal device 1 by way of the congestion controller 55. The application control section 56 further supplies and stores (registers) the search results sent from the telephone company control center 6-1 in the customer control section 53.

FIG. 4 is a drawing showing typical customer information stored internally in the customer control section 53. The customer control section 53 makes a request for customer information to the telephone company control center 6 based on the telephone number input from the user terminal device 1. By internally storing the search results (customer information), the customer control section 53 does not have to make an inquiry to the telephone company control center 6, the next time that the same number is input.

In the example in FIG. 4, customer information consisting of the telephone number "03-2345-6789", the name "Taro Edo" and the address, "* * * Chuoh-ku, Tokyo" are stored in the first entry. The customer information consisting of the telephone number "045-123-4567", the name, "Ms. Hanako Heisei" and the address, "* * * Yokohama-shi, Kanagawa-ken" are stored in the second entry.

The customer information is not limited to a name and address and related items such as the serial number or the contract number of the user terminal device 1 may also be added.

The basic operation of the user terminal device 1 is described next. The viewer operates a remote controller 42, and when an order to receive a specific program is made, an infrared signal corresponding to that order is output from the remote controller 42. When the light detector 26 receives this signal, a signal corresponding to this signal is output to the CPU 22 by way of the system bus 25.

When an instruction signal is received, the CPU 22 controls the tuner 11 and makes it select an intermediate signal of the transmit channel that includes the selected program. The tuner 11 receives by means of the BS antenna the intermediate signal of the transmit channel that was instructed (specified), demodulates the baseband signal and supplies the output to the digital demodulator 12. The digital demodulator 12 performs digital demodulation of the baseband signal that was input, and supplies the data output to the error correction circuit 13. After performing error correction of the data that was input, the error correction circuit 13 sends the output to the demultiplexer 14.

The demultiplexer 14 selects the program channel data instructed from the CPU 22 from the transmit channel data input by the error correction circuit 13, and supplies the output to the MPEG decoder 23 by way of the system bus 25. The MPEG decoder 23 decodes the input data by the MPEG method, and outputs the audio signal to a speaker not shown in the drawing. The video signal output from the MPEG decoder 23 is output by way of an OSD circuit 24 and displayed on a CRT not shown in the drawing.

When the received signal has been encoded (scrambled) by means of a primary key, the IC card 41 utilizes the internally stored primary key and descrambles the data output from the demultiplexer 14. The descrambled data is output to the MPEG decoder 23, decoded as previously described and displayed.

When the received video signal has been encoded (scrambled) by means of a secondary key, the cellular telephone module 18 accesses the center (not shown in drawing) supervising the secondary key by way of the nearest relay station 2, acquires the secondary key and stores the key in a flash memory 15. The CPU 22 utilizes the now acquired secondary key to decode the secondary scrambling of the video signal whose primary scrambling was decoded.

When secondary encoding (scrambling) has been applied, double-decoding (descrambling) is performed and a viewable video signal is now acquired for the first time.

Besides real-time viewing of programs, the same descrambling with the secondary key can also be performed, when operation by the viewer specifies programs stored in the hard disk drive 16 and outputs them to the MPEG decoder 23.

This secondary decoding (descrambling processing) can also be implemented by installing dedicated hardware and implementing descrambling with the dedicated hardware rather than by implementing with the CPU 22.

Figure 5:
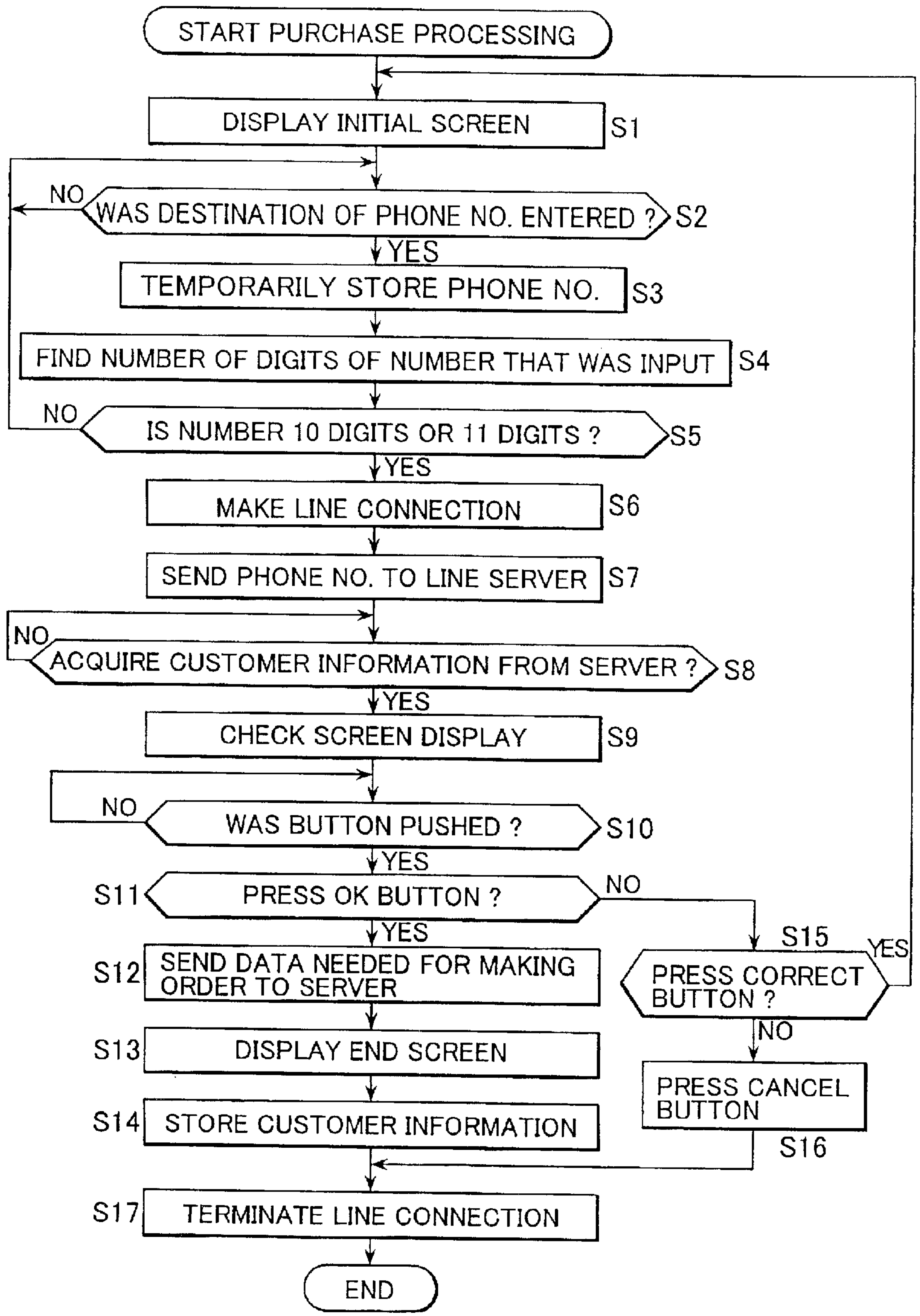
FIG. 5 is a flow chart for describing the purchase processing.

The purchase processing of the product implemented by the user terminal device 1 is next described while referring to the flowchart in FIG. 5. In this processing, the user operates the remote controller 42 and the processing starts when an instruction (command) for purchasing the product has been issued.

In step S1, the CPU 22 of user terminal device 1 displays the initial screen on the monitor. The initial screen such as shown for example in FIG. 6 is displayed in this way.

Figure 6:
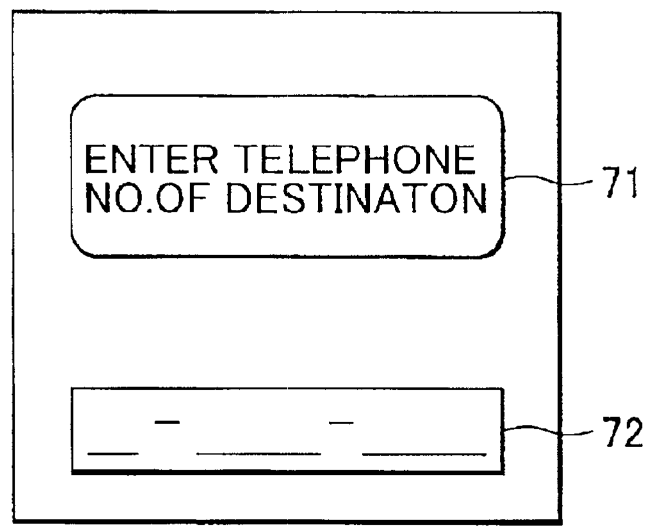
FIG. 6 is a drawing showing a typical initial screen display.

In the example in FIG. 6, the message, "Enter telephone No. of destination." is displayed for the user in message display area 71. After checking this message, the user enters the telephone number of the delivery address in the telephone number entry area 72 with the remote controller 42.

Returning to FIG. 5, in step S2, the CPU 22 determines whether or not the user has entered the telephone number of the destination (delivery address) or in other words, whether or not a telephone number has been entered in the telephone number entry area 72, and stands by until the telephone number of the destination is entered. Then in step S2, when determined that the telephone number (such as 03-2345-6789) has been entered, the processing proceeds to step S3, and the CPU 22 temporarily stores the telephone number entered in step S2, into the flash memory 15 or in the hard disk drive 16.

In step S4, the CPU 22 calculates the number of digits of the number (telephone number) temporarily stored in the flash memory 15 or in the hard disk drive 16 in the processing in step S3. In step S5, the CPU 22 determines whether or not the number of digits calculated in the processing of step S4 is 10 digits or 11 digits, and when determined to be neither 10 or 11 digits, the processing returns to step S2 and the above described processing is repeated.

When determined in step S5, that 10 digits or 11 digits were calculated in the processing of step S4, the processing proceeds to step S6, and the CPU 22 controls the cellular telephone module 18 to make a line connection with the server 3 by way of the relay station 2.

In step S7, the CPU 22 sends (transmits) the telephone number (in this case, 03-2345-6789) temporarily stored in the flash memory 15 or in the hard disk drive 16 in the processing in step S3, to the server 3. In this way, the server 3 determines whether or not customer information (FIG. 4) already corresponding to that telephone number is stored internally in the customer control section 53 based on the telephone number sent from the user terminal device 1. When then determined that the customer information is stored there, the server 3 sends this customer information (in the case of the example of FIG. 4, the information entered in the first item) to the user terminal device 1.

In step S8, the CPU 22 determines whether or not the customer information was acquired from the server 3, and stands by until the customer information is acquired. Then, in step S8, when determined that the customer information was acquired from the server 3, the processing proceeds to step S9, and the CPU 22 displays the check screen on the monitor. The check screen is in this way, displayed for example as shown in FIG. 7.

Figure 7:
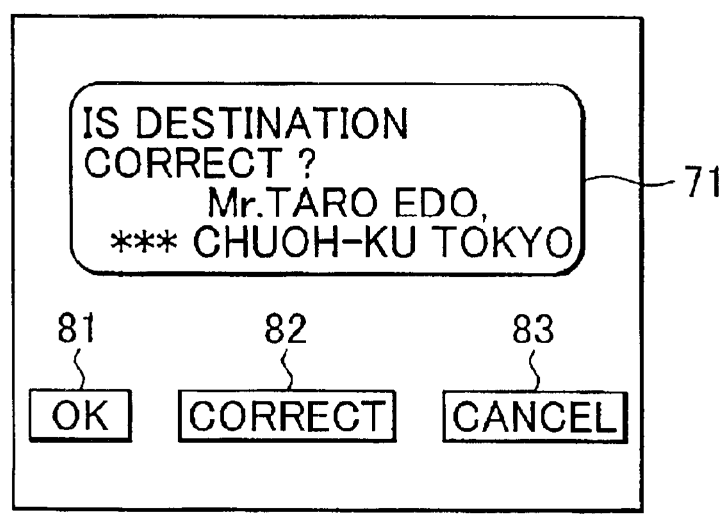
FIG. 7 is a typical display showing the check screen.

In the example in FIG. 7, along with displaying the message, "Is destination correct?" in the message display area 71 to the user, the destination address and name (in the example in FIG. 7, Mr. Edo Taro * * * Chuoh-ku, Tokyo) are also displayed. The user using the remote controller 42 after checking the message, presses the OK button 81, the CORRECT button 82 or the CANCEL button 83.

Returning to FIG. 5, in step S10, the CPU 22 determines whether or not the buttons displayed on the check screen were depressed, and stands by until the buttons are depressed. When a button is then depressed by the user, the processing proceeds to step S11, and the CPU 22 determines whether or not the button depressed in step S10 was the OK button 81.

In step S11, when determined that the OK button 81 was depressed by the user, the processing proceeds to step S12, and the CPU 22 send the data required for the order (purchasing order information) input by the user to the server 3. The order designated product is in this way issued to the service provider 5, based on the (purchase) order information received from the user terminal device 1. The server 3 then receives the order acceptance completion information from the service provider 5, and sends information relating to order acceptance completion to the user terminal device 1.

In step S13, the CPU 22 displays the end (or quit) screen on the monitor based on information relating to order acceptance completion sent from the server 3. The end screen is in this way is displayed for example, as shown in FIG. 8.

Figure 8:
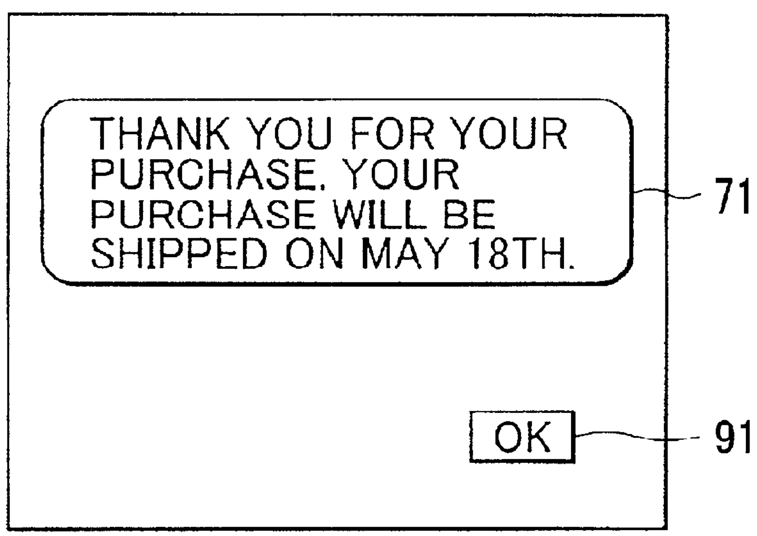
FIG. 8 is a typical display showing the end screen.

In the case of the example shown in FIG. 8, along with displaying a "Thank you for your purchase." message on the message display area 71, the shipping date (May 18, in the example in FIG. 8) is displayed. The user operates the remote control 42 after checking this message and presses the OK button 91.

Returning to FIG. 5, in step S13, when the shipping data is displayed on the end screen by the user (in other words, when the OK button 91 was pressed), the processing proceeds to step S14, and the CPU 22 stores the customer information acquired from the server 3, into the flash memory 15 or the hard disk drive 16.

When determined in step S11, that the OK button 81 was not pressed by the user, the processing proceeds to step S15, and the CPU 22 further determines whether or not the CORRECT button 82 was pressed by the user.

In step S15, when determined that the CORRECT button 82 was pressed by the user, the processing returns to step S1 and the initial menu (FIG. 6) is again displayed, and the above described processing is repeated. Then, in step S15, when determined that the CORRECT button 82 was not pressed by the user, the processing proceeds to step S16, and the CPU 22 verifies that the button pressed by the user was the CANCEL button 83 and the processing proceeds to step S17.

After the processing in step S14 or step S16, the CPU 22 in step S17, controls the cellular telephone module 18 to terminate the line connection with the server 3.

The user terminal device 1 can in this way acquire the delivery address information (customer information) just by entering the telephone number for the delivery address of the product. The user therefore does not have to enter information such as the name or address of the delivery address.

Figure 9:
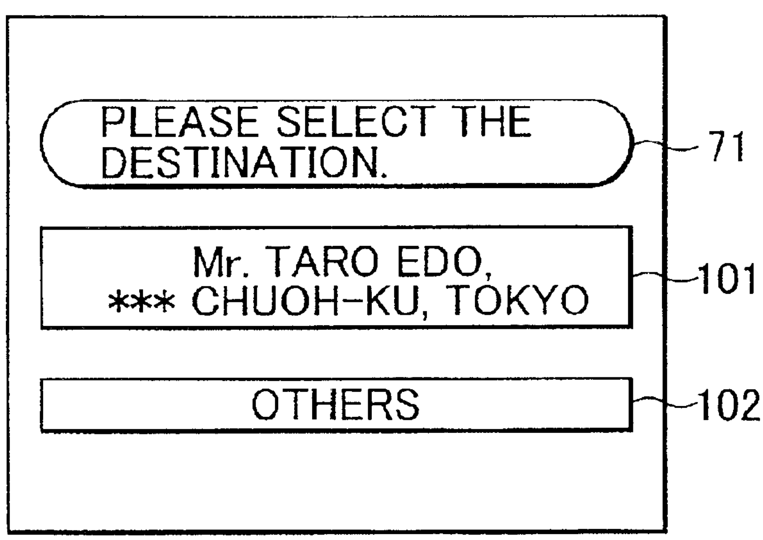
FIG. 9 is a typical display showing another initial screen.

In the above processing, by storing the customer information acquired from the server 3 in the flash memory 15 or the hard disk drive 16, the processing required the next time can be simplified. In other words, the CPU 22 can display the customer information previously stored in the flash memory 15 or the hard disk drive 16, as a list as shown in FIG. 9. The user can in this way specify a delivery address from the list displayed in the customer information 101. Further, to specify a delivery address not shown in the list, an initial menu can be displayed such as shown in FIG. 6, by the selection of another entry area (OTHERS) 102, and the above described processing performed.

Figure 11:
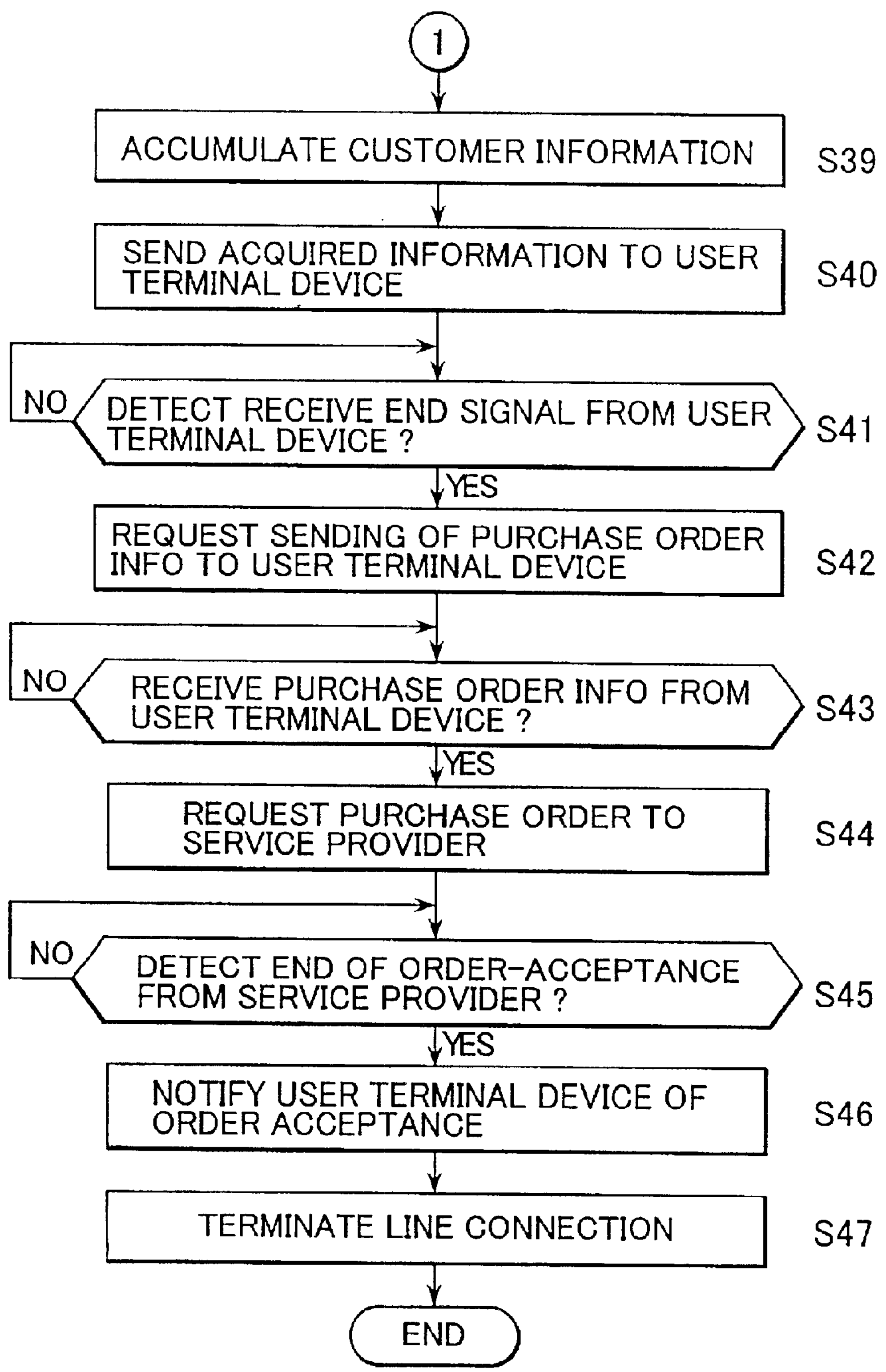
FIG. 11 is a flow chart continuing from FIG. 10.

The acceptance processing implemented by the server 3 is next described while referring to the flow charts in FIG. 10 and FIG. 11.

In step S31, the congestion control section 51 of the server 3 determines whether or not the connection was terminated from the user terminal device 1 by way of the congestion controller 55, and stands by for line connection from the user terminal device 1. Also, in step S31 when determined that a line connection was made from the user terminal device 1, the processing proceeds to step S32, and the customer control section 53 acquires the telephone number (for example, 03-2345-6789) sent from the user terminal device 1 by way of the congestion controller 55.

In step S33, the customer control section 53 determines whether or not customer information corresponding to the telephone number acquired in step S32 is already stored (registered). If found not to be already stored, the telephone company (for example, the telephone company: A Corporation) is specified from that telephone number. In step S34, the congestion control section 51 controls the congestion controller 55, to establish a line connection with the telephone company control center 6-1 of the telephone company specified in step S33 (in this case, the telephone company: A Corporation).

In step S35, the congestion control section 51 controls the congestion control section 55, and determines whether or not a line connection was established between the telephone company control center 6-1 and the server, and stands by for establishment of a server connection. In step S35, when the server connection of the congestion controller 55 is established, the processing proceeds to step S36, and the customer control section 53 makes a search request for customer information to the telephone company control center 6-1. The telephone company control center 6-1 then searches the customer information based on the telephone number (in this case, 03-2345-6789) supplied by the server 3.

In step S37, the customer control section 53 determines whether or not the customer information (search results) have been acquired from the telephone company control center 6-1, and stands by until the customer information is acquired. In step S37, when then determined that the customer information has been acquired from the telephone company control center 6-1, the processing proceeds to step S38, and the congestion control section 51 controls the congestion controller 55, to terminate the line connection with the telephone company control center 6-1.

In step S39, the customer control section 53 internally accumulates the customer information acquired in the processing of step S37 (FIG. 4). In step S40, the customer control section 53 sends the acquired information (customer information) obtained by the processing in step S37 to the user terminal device 1 by way of the congestion controller 55. At the user terminal device 1, a check menu is in this way displayed on the monitor as shown in FIG. 7. When the user presses the OK button 81 after verifying this check menu, a receive completion command is sent to the server 3.

Instep S41, the congestion control section 51 determines whether or not the receive completion command sent from the user terminal device 1 by way of the congestion controller was detected, and stands by until the receive completion command is detected. In step S41, when determined that the receive completion command sent from the user terminal device 1 was detected, the processing then proceeds to step S42, and the customer control section 53 requests the sending of purchase ordering information to the user terminal device 1 by way of the congestion controller 55. The user terminal device 1 in this way, orders the purchase of a product for shipping the designated delivery address.

In step 43, the customer control section 53 determines whether or not the purchase ordering information sent by way the congestion controller 55 from the user terminal device was received, and stands by until the purchase ordering formation is received. In step 43, when determined that the purchase ordering information from the user terminal device 1 was received, the processing proceeds to step S44, the congestion control section 51, based on the purchasing order information received in the processing of step S43, makes a request to the service provider 5 for a purchase order of a specified product. The service provider 5 in this way, notifies the server 3 of completion of order-acceptance for a specified product, based on the purchase-order request from the server 3.

In step S45, the congestion control section 51 determines whether or not order-acceptance completion from the service provider 5 was detected, and stands by until the order-acceptance is completed. In step 45, when determined that order-acceptance completion from the service provider 5 was detected, the processing proceeds to step S46, and the congestion control section 51 notifies the user terminal device 1 of order-acceptance completion by way of the congestion controller 55.

In step S47, the congestion control section 51 controls the congestion controller 55, to terminate the line connection with the user terminal device 1, and ends the processing.

When the customer information corresponding to the telephone number that was entered, is already stored in the customer control section 53, the processing in the above steps S34 through S39 can be omitted.

The server 3 can in this way easily search the customer information (such as names and addresses) from the telephone number of the delivery address sent from the user terminal device 1.

Figure 12:
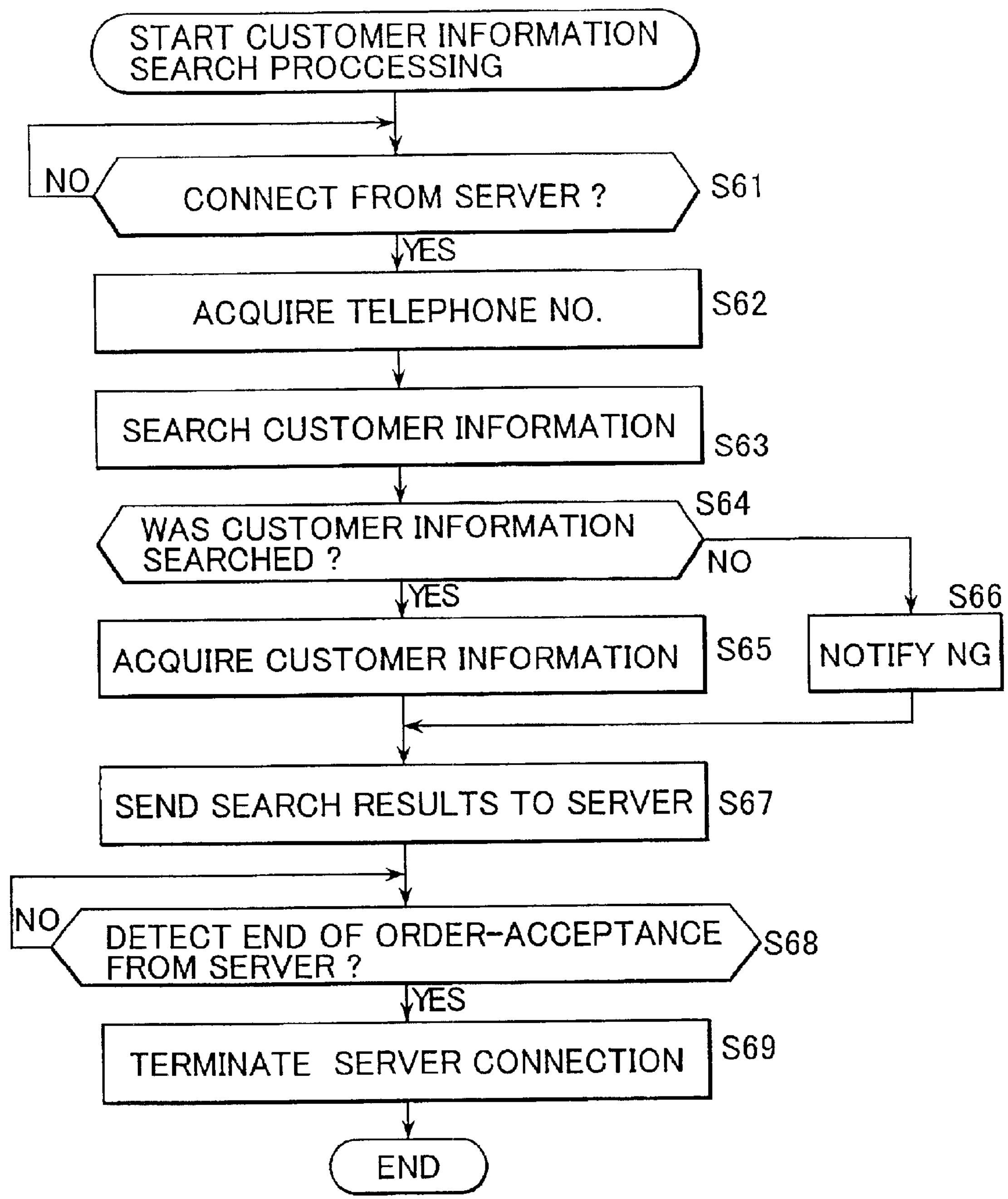
FIG. 12 is a flow chart for describing the customer information search processing.

The customer information search processing implemented by the telephone company control centers 6-1 through 6-3 is next described while referring to the flow chart of FIG. 12. Identical processing is implemented in the telephone company control centers 6-1 through 6-3 so the following example describes only the telephone company control center 6-1.

In step S61, the telephone company control center 6-1 determines whether or not a connection is made from the server 3, and stands by until a connection is made from the server 3. In step S61, when determined that a connection is made from the server 3, the processing proceeds to step S62, and the telephone company control center 6-1 acquires the telephone number supplied from the server 3.

In step S63, the telephone company control center 6-1 searches the customer information accumulated in the database 7-1 based on the telephone numbers acquired by the processing in step S62. In step S64, the telephone company control center 6-1 determines whether or not the customer information was found by the processing of step S63 (determines whether the corresponding customer information was found or not), and when determined that the corresponding customer information was found, the processing proceeds to step S65.

In step S65, the telephone company control center 6-1 acquires the customer information found in the processing of step S63.

In step S64, when determined that the customer information was not found by means of the processing of step S63, the processing proceeds to step S66, and the telephone company control center 6-1 generates an invalid information notice to report that the search results are invalid.

After the processing of step S65 or step S66, in step S67, the telephone company control center 6-1 sends the search results (customer information or invalid information notice) to the server 3. The server 3 in this way receives the search results sent from the telephone company control center 6-1, and notifies the telephone company control center 6-1 that the receiving of search results is complete.

In step S68, the telephone company control center 6-1 determines whether or not the receive-completion command sent from the server 3 was detected, and stands by until the receive command is detected. In step S68, when determined that the receive-completion command sent from the server 3 was detected, the processing proceeds to step S69, and the telephone company control center 6-1 terminates the line connection to the server 3 and ends the processing.

As explained above, just by entering the telephone number of the delivery address instead of the name and address of the product delivery address, a corresponding name and address (customer information) can be designated from that telephone number. Also, by storing the acquired customer information in the user terminal device 1 or the server 3, there is no need for searching the customer information the next time the same telephone number is input so that the delivery address can be specified in a short time.

Besides implementing the above processing with hardware, software may also be used. When implementing the processing by using software, the program comprising that software may be dedicated hardware built into a computer or may be installed from a recording medium as different programs installed for example onto, a general purpose computer capable of implementing different types of functions.

The recording medium as shown in FIG. 2, may not only be comprised of programs recorded on a magnetic disk 31 (including floppy disks), an optical disk 32 (including CD-ROM {Compact Disk Read Only Memory} and DVD {Digital Versatile Disk}), magneto-optical disk 33 (including MD {Mini-disk}) or packaged memories made up of semiconductor memories 34 and distributed to the user separately from the computer, but may also be provided as a medium built into the computer beforehand, such as on a hard disk drive 16 on which the program is recorded.

In these specifications, the steps listed for the program recorded on the recording medium are of course performed along a time base (time sequence) in the order described, however the program steps need not always be performed in a time-wise sequence and may for example be implemented in parallel or separately.

Also in these specifications, the term "system" refers to the equipment overall comprised of a plurality of devices.

What is claimed is:

1. An information processing apparatus for delivering a product to a delivery address specified from a first device, comprising:

search request means for connecting to a second device based on a telephone number entered from said first device and requesting a search of customer information;

storage means for storing customer information supplied from said second device;

search means for searching customer information stored in said storage means based on said telephone number input from said first device;

presenting means for presenting said search results supplied from said search means or said second device to said first device;

controller means for controlling said presenting means, said search request means, and said search means, wherein if said search results are obtained from said search means said controller means causes said presenting means to present said search results supplied from said search means to said first device, and if said customer search information results are not obtained from said search means said controller means causes said search request means to connect to said second device and request a search of customer information and said controller means causes said presenting means to present said search results supplied from said second device to said first device; and order issuing means for issuing an order for said product to a third device based on said order information input from said first device.

2. An information processing apparatus according to claim 1, wherein said customer information includes a name or an address.

3. An information processing method for an information processing apparatus for delivering a product to a delivery address specified from a first device, comprising:

searching stored customer information based on a telephone number input from said first device;

if said search results are obtained from said searching of stored customer information:

presenting said search results supplied to said first device;

if said search results are not obtained from said searching of stored customer information:

connecting to a second device based on said telephone number, requesting a search of customer information by said second device based on said telephone number, storing customer information supplied from said second device, presenting said search results supplied from said second device to said first device; and issuing an order for a product to a third device based on order information input from first device.

4. A recording medium holding a computer-readable program for an information processing apparatus for delivering a product to a delivery address specified from a first device, wherein said program comprises instructions for:

searching stored customer information based on a telephone number input from said first device;

if said search results are obtained from said searching of stored customer information:

presenting said search results supplied to said first device; if said search results are not obtained from said searching of stored customer information:

connecting to a second device based on said telephone number, requesting a search of customer information by said second device based on said telephone number, storing customer information supplied from said second device, presenting said search results supplied from said second device to said first device; and issuing a purchase order for a product to a third device based on order information input from said first device.

5. An information processing system composed of a first information processing apparatus, a second information processing apparatus, a third information processing apparatus, and a fourth information processing apparatus, wherein said first information processing apparatus comprises:

first sending means for entering the telephone number of the product delivery address and sending the telephone number to said second information processing apparatus, acquisition means to acquire customer information corresponding to a telephone number presented from a second information device; and second sending means for sending said product ordering information to said second information processing apparatus, wherein said second information processing apparatus comprising:

search request means for connecting to said third information processing apparatus based on said telephone number entered from said first information processing apparatus and requesting a search of said customer information;

presenting means for presenting said search results supplied from said third information processing apparatus to said first information processing apparatus; and order issuing means for issuing an order for said product to said fourth information processing apparatus based on said order information input from said first information processing apparatus, wherein said third information processing apparatus comprising:

storage means for storing said customer information;

search means for searching said customer information stored in said storage means based on a search request from said second information processing apparatus; and supply means for supplying said search results of said search means to said second information processing apparatus, and wherein said fourth information processing apparatus comprising:

notification means for receiving the order for purchasing said product from said second information processing apparatus and notifying the second information processing apparatus that receipt of the purchasing order is complete.

* * * * *